United States Patent [19]
Iannini

[11] 3,894,351
[45] July 15, 1975

[54] INDOOR, HORIZONTAL INSECT KILLER
[75] Inventor: Robert E. Iannini, Milford, N.H.
[73] Assignee: Rid-O-Ray, Inc., Hudson, N.H.
[22] Filed: June 20, 1974
[21] Appl. No.: 481,113

[52] U.S. Cl. .............................................. 43/112
[51] Int. Cl. .............................................. A01m 1/22
[58] Field of Search ................. 43/112, 88, 113, 99

[56] References Cited
UNITED STATES PATENTS
| | | | |
|---|---|---|---|
| 2,835,071 | 5/1958 | Partridge | 43/112 |
| 3,491,478 | 1/1970 | Gilbert | 43/112 |
| 3,729,857 | 5/1973 | Giordano | 43/112 |
| 3,823,506 | 7/1974 | Iannini | 43/112 |

Primary Examiner—Warner H. Camp
Attorney, Agent, or Firm—Pearson & Pearson

[57] ABSTRACT

An insect electrocuting device is hung from a ceiling, indoors with a generally horizontal, polygonal enclosure containing horizontal black light tubes, each on an opposite side of a reflective baffle and encircled by a pair of concentric grid electrodes. The bottom of the enclosure is a hinged collection tray and all of the components are contained in the end caps, the upper and side walls being meshed to permit the tubes and baffle to be visible to insects, especially flies, flying near the ceiling. U-shaped tubes mounted in one end cap permit the other end cap to serve as a collection tray when the device is hung vertically.

12 Claims, 5 Drawing Figures 3,894,351

SHEET 1

INDOOR, HORIZONTAL INSECT KILLER

BACKGROUND OF THE INVENTION

It is well known to provide vertically disposed insect killers with fluorescent tubes encircled by grid electrodes for outdoor use where deposit of insect parts and bodies below the device is not a problem. For indoor use, as exemplified by my U.S. Pat. No. 3,768,196 of Oct. 30, 1973, the insect killers are usually hung from the ceiling in a kitchen, restaurant or the like and must attract flies hovering near the ceiling without any danger of unsanitary deposit of insect bodies on the food or patrons therebelow.

In U.S. Pat. No. D 190,124 to Houghton of Apr. 18, 1961, a hanging insect trap is shown in which the top is closed by a top cap, which would prevent the tubes from being visible from above. Similarly in U.S. Pat. No. 3,680,251 to Springer of Aug. 1, 1972 the hanging trap shown has a top cap and open ends; and in addition, the bottom is meshed to permit fall through of insect parts.

One problem with insect electrocutors which are known in the prior art is that there must be a current limiting device in the power supply to make the electrocutor a safe appliance to have around children and animals. In order to achieve current limitation, it is necessary to place a high impedance device in series between the power supply and the electrodes. During the instant of electrocution, current will surge from the power supply through the current limiting device and between the electrodes. Thus the current limiting device and the electrodes form a voltage divider with the majority of the power being dissipated by the current limiting device and not in the insect which is being electrocuted. Due to the inefficiency of this design, the power supply must be capable of producing a much higher voltage than is actually necessary to electrocute the insect.

The electrodes shown in the Springer patent are typical of those known in the prior art in that they do not enclose the light source. Insects may therefore reach the light and leave without being electrocuted and the accessibility of the light must be limited to increase the likelihood that insects will pass through the electrode gap when approaching the light source.

It would be desirable to construct an insect electrocuting device having a means for providing a high instantaneous surge of current and yet maintain current limiting of the device so that it would be harmless to humans and animals. The electrodes of the device should completely surround the light source so that insects must pass through them when approaching the light. The light source should be visible, as the attractant, from both the sides and the top, while the bottom must be closed for sanitary reasons.

SUMMARY OF THE INVENTION

In this invention, a low current power supply provides voltages of opposite polarities to either grid. When energized, an energy storing electric field exists between the grids due to their mutual capacitance. The grids are arranged to form a "tank circuit" with the power supply transformer secondary winding so that considerable energy may be stored between them. When an insect flies between the two grids, the energy stored in the tank circuit is dissipated in the insect in a very short period of time. The instantaneous power delivered to the insect is far greater than could be provided on a steady state basis by the power supply. Such a discharge would be harmless to a person or animal who came in contact with the grids and therefore, no current limiting device is needed for this device.

The arrangement of the grids, light source and reflective baffle is such that they are virtually surrounded with an electrified gap which will incinerate an insect approaching them from any direction. Thus, an insect will almost certainly be exterminated before reaching the light source.

The electrified grids are enclosed on three sides by a coarse, non-electrified mesh which keeps animals and children away from the grid portion of the electrocuting device and also prevents the grids from being bent or otherwise damaged. The ends of the device are enclosed by two end caps and the bottom by a tray.

When it is desired to remove the insects which have accumulated within the enclosure, a latch is opened which permits the tray to swing downwardly thereby opening the enclosure for easy cleaning. The latch also provides an electrical contact which automatically disables the grid electrodes during maintenance periods when the enclosure is opened.

DESCRIPTION OF THE PREFERRED EMBODIMENT

In this application and accompanying drawings, there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

Figure 1:
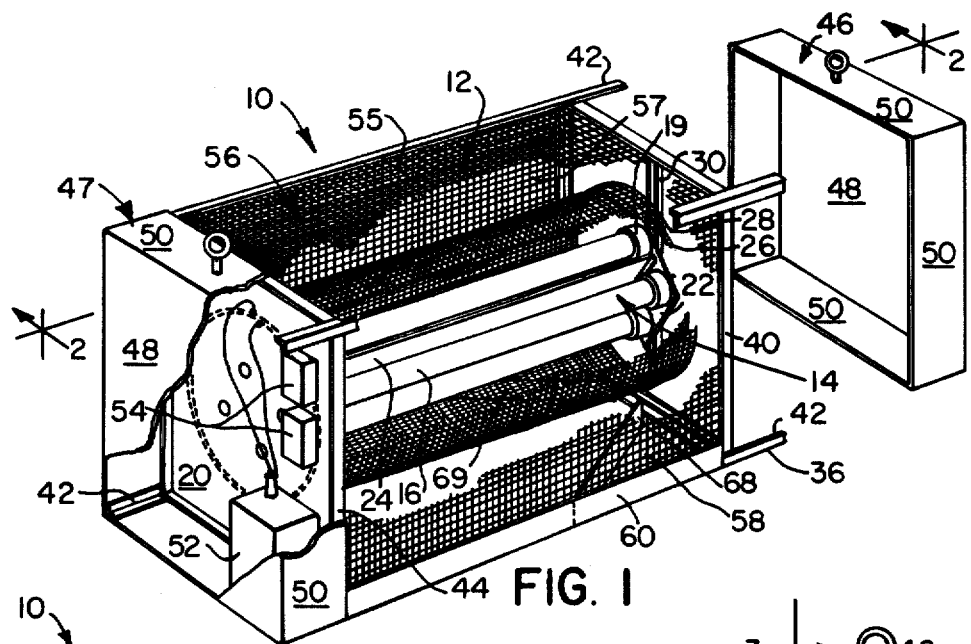
FIG. 1 shows an exploded cutaway perspective view of the insect electrocuting device.
Figure 2:
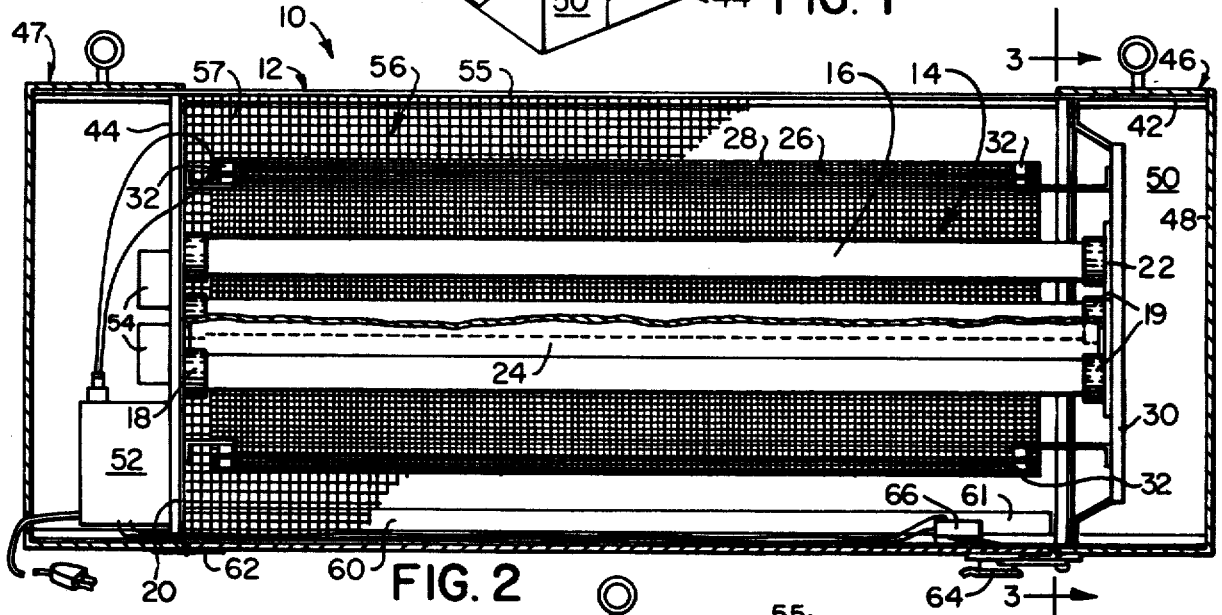
FIG. 2 shows a detailed cross-sectional view of the device taken on line 2-2 of FIG. 1.
Figure 3:
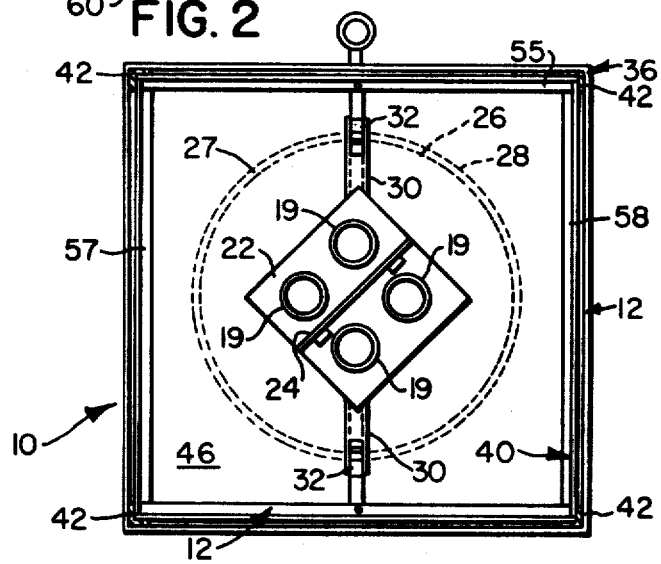
FIG. 3 shows a cross-sectional view of the device taken on line 3-3 of FIG. 2.

FIGS. 1-3 show generally the insect electrocuting device 10. Functionally, the device may be divided into a horizontally extending, elongated, protective enclosure 12 and an inner electrified portion 14. The inner portion comprises four fluorescent bulbs 16 preferably of the black light type which run horizontally the entire length of the enclosure and are mounted at each end into sockets 18 and 19. Four sockets 18 are mounted on mounting plate 20 and four sockets 19 are mounted on mounting plate 22, the latter being supported on bracket 30. A flat, reflective baffle 24, or plastic-coated paper is coextensive with bulbs 16 and is secured on its ends to mounting plates 20 and 22.

Inner wire grid 26 is shown as a cylindrical wire mesh which essentially encloses fluorescent tubes 16. This grid may be of any shape however it is essential that it, together with mounting plates 20 and 22 does substantially enclose tubes 16 or an equivalent light source thereto. Inner grid 26 is in turn enclosed by outer, concentric cylindrical grid 28. In this embodiment, grids 26 and 28 are both shown as being cylindrical and coaxial with an air gap 27 between the two.

Mounting plate 22 is attached to bracket 30 by welding or bolting. Grids 26 and 28 are separated by four elongated insulating spacers 32 of Teflon or the like, which also serve as supports, and connectors affixed to mounting plate 20 and bracket 30.

The protective enclosure 12 includes a skeletonized frame 36 made from square plate 20, square, open frame 40, formed of angle members, and four angle members, or ribs, 42 which attach to the corners of plate 20 and open frame member 40. The edges of mounting plate 20 are bent at right angles to the plate to form a skirt 44 around the periphery of the plate 20. Ribs 42 extend horizontally from frame 40 to the corners of mounting plate 20 and fasten to skirt 44.

Ribs 42 extend beyond frame member 40 and mounting plate 20 to serve as guides and supports for end caps, or covers, 46 and 47. End covers 46 and 47 are each formed from end plates 48 whose edges are bent at right angles to the plate to form cover flanges 50. The end caps are assembled onto ribs 42 by aligning the corners of covers 46 and 47, formed by adjacent cover sides 50, with the ends of ribs 42. Covers 46 and 47 slide over the ends of ribs 42 with the exterior surface of the ribs conforming to the interior walls of cover sides 50. The end covers 46 and 47 may be spot welded or otherwise attached to ribs 42.

Transformer 52 and ballast 54 are shown secured to mounting plate 20 and are enclosed between mounting plate 20 and end cover 47.

The protection enclosure 12 is preferably a six-sided polygon, or cube, with top wall 55 and side walls 57 and 58 formed by a coarse wire grid 56, supported by and secured to ribs 42 so that it forms the three adjacent, open-mesh, sides of enclosure 12. The other three walls, or panels, of the six sided figure are formed by opaque sheet material and constitute a bottom tray 60 and the two upstanding, end caps 46 and 47.

In FIG. 2, bottom tray 60 is shown connected to one end cap 47 by hinge 62, this being the end cap which contains all of the electric components. The other end 61 of tray 60 is connected to the other end cover 46 by latch assembly 64. Tray 60 is in its normally closed position with electrical switch 66 closed thereby energizing the cylindrical, meshed, electrode grids 26 and 28. When latch assembly 64 is released and tray 60 is swung outwardly from enclosure 12, electrical switch 66 opens and discontinues the power to the grids 26 and 28. This feature permits enclosure 12 to be safely opened for cleaning while eliminating the danger due to shock from the electrified grids.

For further clarity, FIG. 3 shows a cross-sectional end view of electrocuting device 10. Clearly shown in this figure are sockets 19 mounted on mounting plate 22 with bracket 30 running behind plate 22 and supporting the plate. Bracket 30 is also connected at both ends to open frame member 40. Four ribs 42 are shown at each corner of open frame member 40 and end cap 46 is shown enclosing the entire assembly. Two of the spacers 32 are shown separating grids 26 and 28 and supporting the grids on the bracket 30.

When unit 10 is energized as shown in FIG. 2 with tray 60 in the closed position, power is applied to both the fluorescent bulbs 16 and the electrode grids 26 and 28. End caps, 46 and 47, of tray 60 and the non-electrified wire mesh 56 completely enclose the cylindrical electrode grids 26 and 28, fluorescent bulbs 16 and reflective baffle 24. The mesh of grid 56 is sufficiently large to allow most insects to pass through and approach grid electrodes 26 and 28.

Tubes 16 are selected to cause baffle 24 to radiate a soft white light which attracts insects and at the same time is pleasant for human viewing. Baffle 24 is made from a reflective material; such as, plastic-coated paper which serves to reflect and diffuse the light from the tubes 16 so that they distribute the light evenly over a wide area. The open top wall 55 and open side walls 57 and 58 permit the attractant tubes and baffle to be visible to a flying insect.

In operation, insects are attracted by the glow of tubes 16, and the diffused glow from baffle 24, and pass through grid 56 when approaching the tubes. It is desirable that grids 26 and 28 be arranged so that insects cannot approach tubes 16 unharmed. Thus, the grids surround the light source with a virtually impenetrable "killing gap" 27 which insects must enter when approaching the light source. The parts and bodies of the killed insects fall into collection tray 60 for disposal.

In general, whenever two charged conductive elements are placed near to each other an energy storing electric field exists between them. In this device, the electrodes are connected in parallel with the transformer secondary of the power supply so that the inductance of the transformer and the capacitance of the grids form a "tank circuit" which is capable of storing considerable energy.

The nature of this circuit is such that if a low impedance object, such as an insect, touches both electrodes simultaneously, a large current flows through the low impedance and dissipates the stored energy in a very short period of time. Similarly, if a small insect flies between the electrodes without touching them the insulation of the dielectric between the plates is reduced and a discharge of current will "arc" through the insect. In either event the flow of current through the insect will incinerate it.

The current which is discharged through the insect exceeds the current capacity of the power supply providing current to the tank circuit. Thus, it can be seen that a low current power supply may be used to charge the circuit. This arrangement allows the use of a power supply without current limiting. If a person or small animal should inadvertently touch both grids, he would receive a brief, high energy shock which would not be harmful.

In order to clean the device, tray 60 may be swung downwardly and the insects brushed into a convenient receptacle. When enclosure 12 is opened, switch 66 opens and de-energizes grids 26 and 28 thereby eliminating the possibility that anyone cleaning the device will be injured. Preferably tray 60 includes funnel guides 68 and 69 to guide the deposits into a receptacle.

Figure 4:
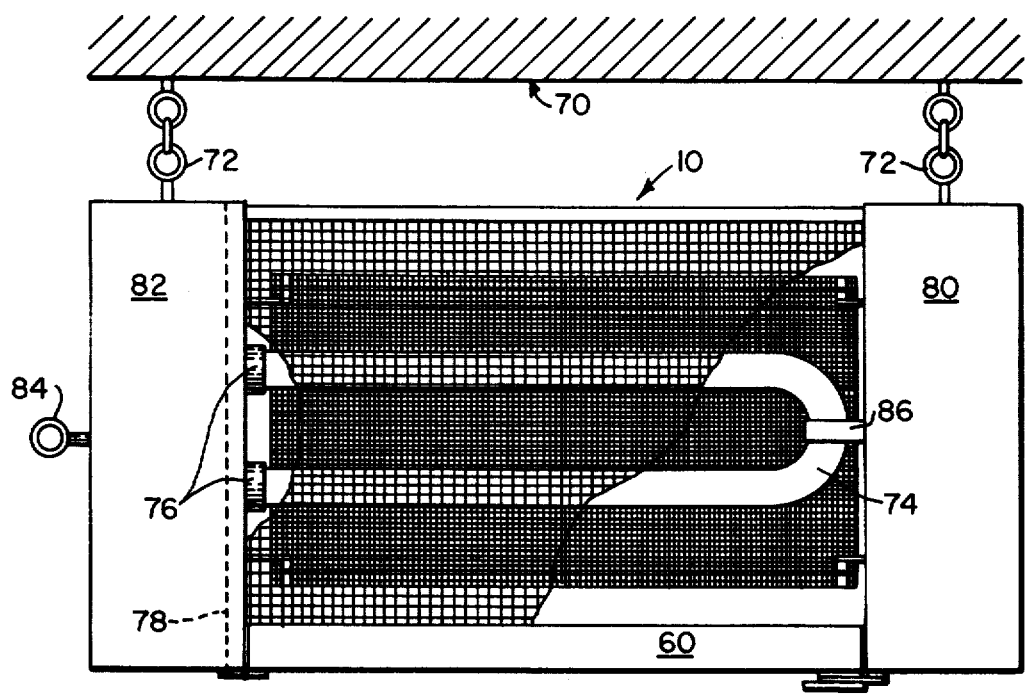
FIG. 4 is a view similar to FIG. 1 of another embodiment having U shaped tubes.
Figure 5:
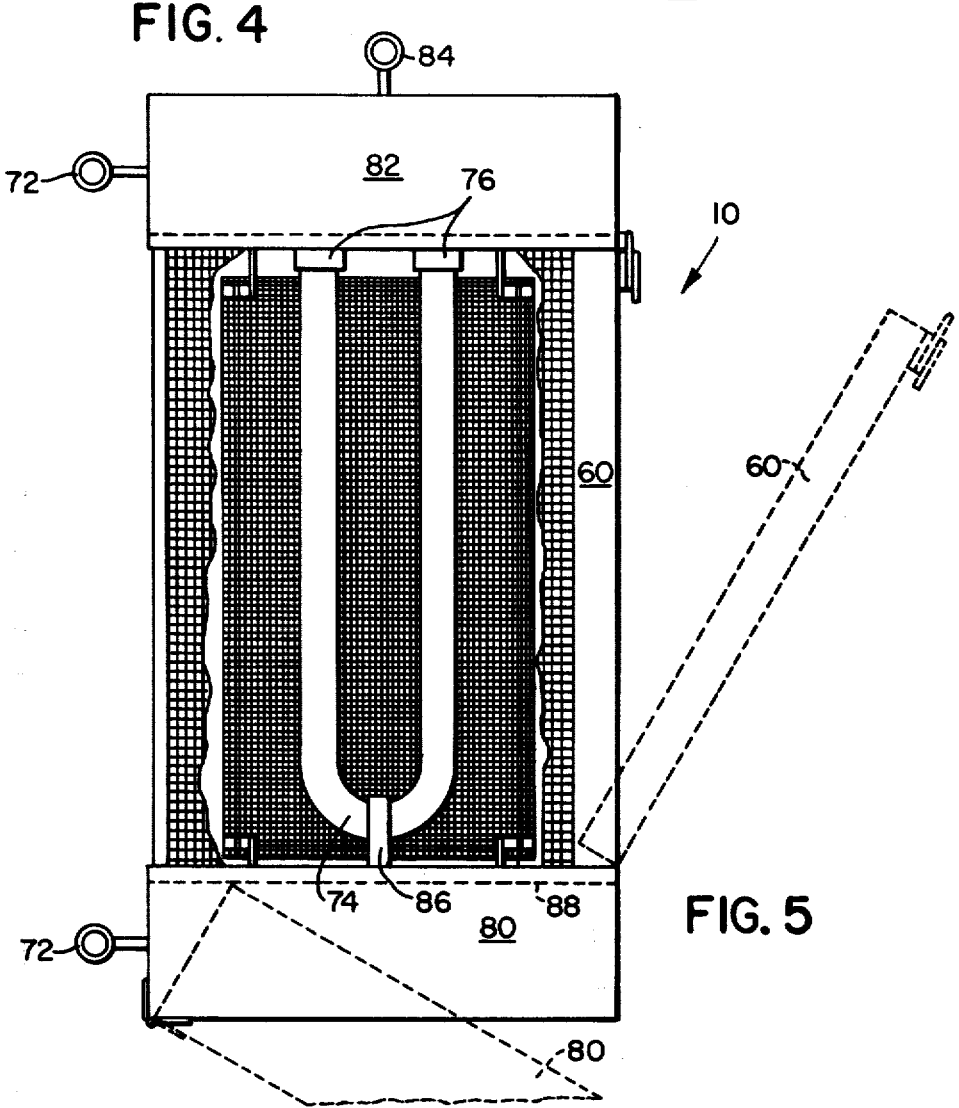
FIG. 5 is a view of the embodiment of FIG. 4 suspended vertically and having an end cap tray as well as a bottom tray.

As shown in FIG. 4, the insect killing device 10 is shown hung horizontally below the ceiling 70 of a kitchen, restaurant or the like to kill the flies hovering near the ceiling, there being a pair of eyelet brackets such as 72. This embodiment of the device 10 is characterized by the U-shaped fluorescent tubes 74 which are contained in sockets 76, all on one removable mounting plate 78. Thus, there is nothing in the end cap 80; so that, as shown in FIG. 5, the device 10 cannot only be used horizontally indoors with its bottom collection tray 60, but can also be hung vertically outdoors with end cap 80 constituting a hinged, latched bottom tray and with all of the electric components securely protected from the elements in the then upper end cap 82. The eyelet bracket 84 permits the device to be hung outdoors and preferably a spring clip 86 is used to support the bight end of the U-shaped tubes 74 on a cross frame brace 88.

It is also understood that the following claims are intended to cover all of the generic and specific features of the invention which might be said to fall therebetween.

I claim:

1. An electric insect killer especially for sanitary indoor use, said insect killer comprising:
   a generally polygonal, elongated enclosure adapted to depend horizontally from the ceiling of a room, said enclosure having:
   a horizontally extending bottom collection tray; a pair of vertically extending end caps of substantially imperforate sheet material; and side and top walls of meshed material to emit light and admit insects,
   fluorescent tube means encircled by a pair of concentric spaced-apart meshed electrode means, extending horizontally within said enclosure from mid-height of one said end cap toward mid-height of the other said cap,
   and reflective baffle means extending horizontally alongside said tube means, for radiating light outwardly therefrom,
   said tube means and baffle means, enclosed within said electrode means, being visible to an insect through the meshed side and top walls of said enclosure to attract the same for electrocution and collection in said tray.

2. An electric insect killer as specified in claim 1 wherein:
   one said end cap includes a removable mounting plate containing all of the electric components of said insect killer including sockets,
   and said tube means comprises U-shaped fluorescent tubes in said sockets.

3. An electric insect killer as specified in claim 2 wherein:
   said enclosure includes spring clip means for releasably supporting the bight end of said U-shaped fluorescent tubes.

4. An electric insect killer as specified in claim 1 wherein:
   said bottom tray is hinged at one end to one said cap and latched at the other end to the other said cap, and
   said tray includes funnel type guide means for guiding insect bodies into a container when hinged downwardly for emptying.

5. An electric insect killer as specified in claim 1 wherein:
   one said end cap includes a mounting plate containing all of the electric components of said insect killer including tube sockets for U-shaped tube means and
   the other said end cap is a latchable pivoted collection tray
   whereby said enclosure may be hung vertically as well as horizontally outdoors as well as indoors.

6. An insect killer as specified in claim 1 wherein:
   said fluorescent tube means is at least two black tubes in parallelism,
   and said baffle means is a flat sheet of plastic coated paper mounted between said tubes and arranged to radiate and diffuse light received from said tubes as a soft white glow.

7. In an insect electrocuting device of the type having a light source for attracting insects, extending from one or more mounting plates,
   a first conductive grid extending from the mounting plates, the mounting plates and grid substantially enclosing the light source,
   a second conductive grid extending from the mounting plates and spaced from the first grid, the second grid and mounting plates substantially enclosing the first grid,
   a power supply connected to the conductive grids for forming an electrical potential difference between the two grids,
   the improvement comprising:
   a horizontally extending, protective enclosure having a bottom tray with an end cap at each end and having upper and side walls of meshed material;
   complete vision to the attractant from above and from each side being thereby provided while the light source and conductive grids are supported by said mounting plates, over said tray.

8. An insect electrocuting device as described in claim 7 wherein:
   the light source is a plurality of tubular light bulbs connected between two mounting plates, each in one of said end caps.

9. An insect electrocuting device as described in claim 7 wherein:
   the first and second grids are cylindrical, and the light source is at least one fluorescent tube of U-shaped configuration.

10. An insect electrocuting device as described in claim 7 wherein:
    the protective enclosure is of six-sided cubical shape and includes a coarse, non-electrified, protective mesh on three adjacent sides.

11. An insect electrocuting device as described in claim 7 wherein:
    the protective enclosure further comprises:
    hinge means connecting one end of said tray to said enclosure for swinging the tray outwardly from the enclosure and,
    a latching means for securing the other end of said tray to said enclosure.

12. An insect electrocuting device as described in claim 11 plus:
    a switch which connects electrical power to the grids when the bottom tray is secured to the enclosure and which disconnects electrical power from the grids when the tray is unconnected to the enclosure.

* * * * *